United States Patent Office
2,715,313
Patented Aug. 16, 1955

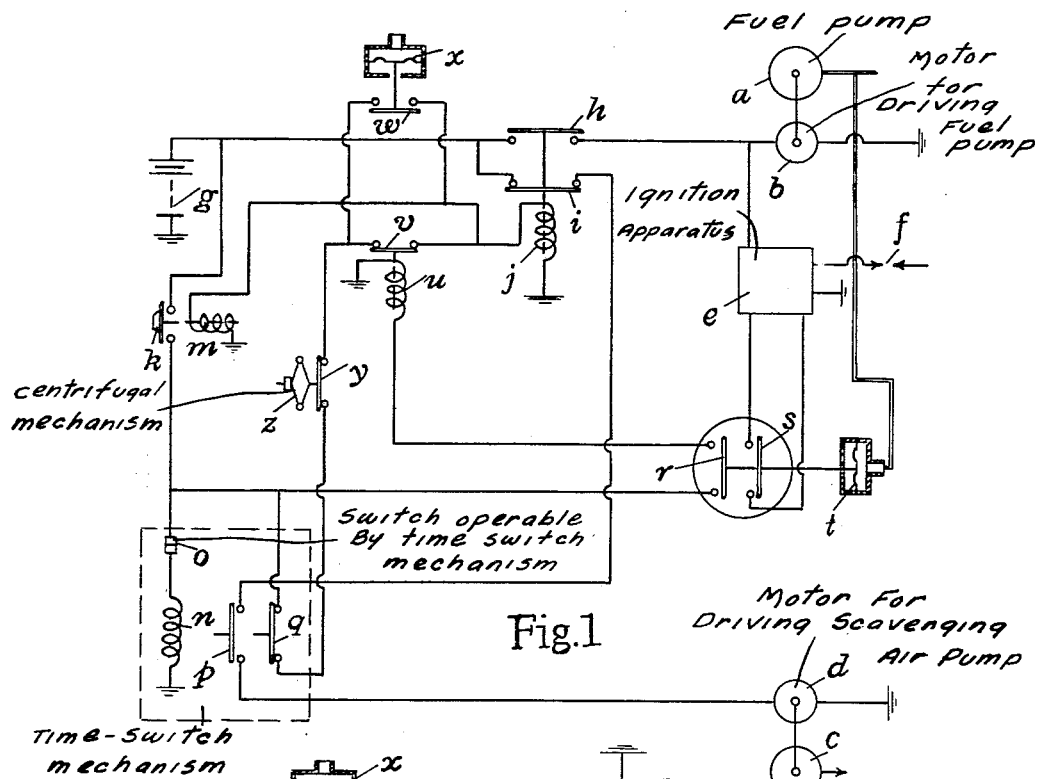
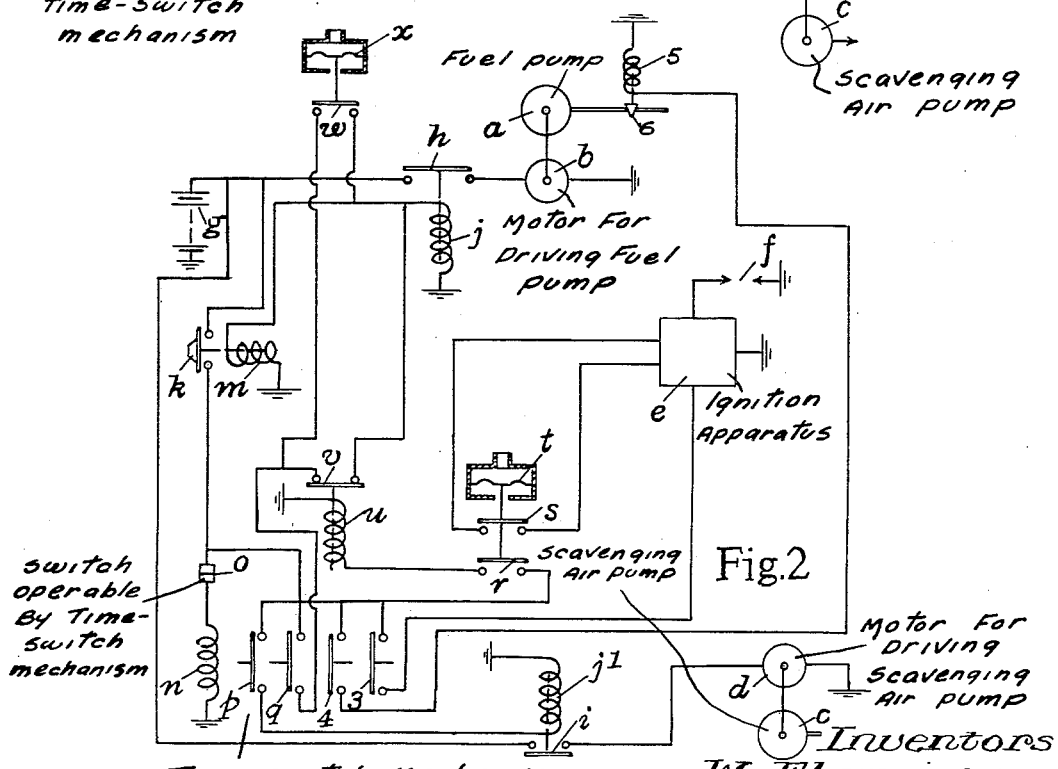

2,715,313
FUEL AND SCAVENGING-AIR SUPPLY SYSTEM FOR ENGINE-STARTING GAS TURBINES

William Fleming, Solihull, Birmingham, and Michael John Loxley, Burnley, England, assignors to Joseph Lucas (Industries) Limited, Birmingham, England Application January 13, 1953, Serial No. 330,966

2 Claims. (Cl. 60—39.14)

This invention relates to means for supplying fuel and scavenging-air to a gas turbine, commonly known as a turbo-starter, used for starting aircraft or other engines, and in which the fuel utilized in the combustion chamber of the turbo-starter is isopropyl nitrate or the like.

The object of the invention is to provide in a convenient form a system for automatically controlling the action of electric motors for driving fuel and scavenging-air pumps, and the action of electrical ignition means for igniting the fuel.

A system in accordance with the invention comprises electromagnetically operated switches for controlling the supply of current to the motors of the fuel and scavenging-air pumps, a manually operable switch for bringing the system into action and having combined with it a retaining electromagnet, an electromagnetically energized time-switch mechanism having therein switches for controlling the electromagnets of the motor-controlling switches, a delayed action switch in a circuit controlling at least the electromagnet acting on the fuel-pump motor switch, a switch operable by fuel pressure for controlling the ignition apparatus and the delayed-action switch, and a switch operable by pressure of the ignited gas for overriding the delayed-action switch, the parts being arranged and adapted to co-operate as herein described.

The invention also comprises a system as defined in the preceding paragraph, having a switch responsive to the speed of the starter for interrupting the circuit associated with the electromagnet acting on the fuel-pump motor controlling switch.

In the accompanying drawing:

Figures 1 and 2 represent diagrammatically two embodiments of the invention.

Referring to Figure 1, the fuel pump is indicated by $a$ and its driving motor by $b$. The scavenging-air pump is indicated by $c$ and its driving motor by $d$. The electrical ignition apparatus and the associated igniting-spark gap are indicated by $e$ and $f$ respectively.

The system which automatically controls the action of the parts above mentioned is supplied with current from a battery $g$, or other convenient D. C. source. The system includes a switch $h$ for controlling the supply of current to the fuel-pump motor $b$, and an associated switch $i$ which controls the supply of current to the motor $d$ of the scavenging-air pump. The switches $h$, $i$ are operable by an electromagnet $j$. When the system is at rest the switches $h$, $i$ occupy the positions shown in the diagram, the switch $h$ being open and the switch $i$ closed.

The system is controlled in part by a manually-operable and normally-open push-button switch $k$. For holding this switch closed there is provided an electromagnet $m$. In the circuit controlled by the push-button switch $k$ is a time-switch mechanism of known form which includes an electromagnet $m$. The function of this electromagnet is to energize a spring which serves to actuate a cam or other mechanism for actuating switches $o$, $p$, $q$. The switch $o$ is in series with the switch $k$ and is opened by the said mechanism immediately after the spring has been energized.

The switch $q$ controls a circuit containing the electromagnet $j$ and other switches to be hereinafter mentioned. The switch $p$ is in the circuit of the switch $i$ associated with the motor of the scavenging-air pump.

The circuit containing the ignition apparatus is at one end connected to the system at a position between the switch $h$ and the fuel pump motor $b$, and is controlled by a switch $s$, which is movable to the closed condition by pressure on a flexible diaphragm $t$ of liquid derived from the fuel pump. To the switch $s$ is connected a switch $r$ which controls a circuit leading from the push-button circuit to an electromagnet $u$ which can open a normally-closed switch $v$ in the circuit which includes the electromagnets $j$, $m$, the switch $v$ having associated with it any convenient delayed-action means. Also in parallel with the switch $v$ is arranged a normally-open switch $w$ which is movable to its closed position by action of a flexible diaphragm $x$ which is subject to the pressure of the gas in the fuel combustion chamber. Further, if desired, there may be arranged in the circuit controlled by the switch $q$ a normally-closed switch $y$ which is movable to its open position by a centrifugal mechanism $z$ operated by the starter.

The mode of action of the system is as follows: On closing the push-button switch $k$, the electromagnet $n$ is energised for setting in motion the associated time-switch mechanism. The immediate effect of this is to cause the electromagnet $m$ to hold the push-button switch closed, and the electromagnet $j$ to open the switch $i$ and close the switch $h$. Also the switch $o$ is opened. Current can now flow to the fuel-pump motor $b$ and set the fuel pump in motion. When the pressure at which fuel is discharged from the pump reaches a predetermined amount it closes the switches $r$, $s$. The effect of closing the switch $s$ is to bring the ignition apparatus into action for firing the fuel in the combustion chamber. The effect of closing the switch $r$ is to excite the electromagnet $u$, but the latter has no immediate effect on the switch $v$ owing to the action of the associated delay means.

If no ignition occurs within the pre-arranged time interval, the switch $v$ opens, and thereby causes the electromagnets $j$, $m$ to release the associated switches. Meanwhile the switch $p$ will have closed and current will be supplied to the scavenging-air pump motor when the swich $i$ is reclosed. Later the time-switch mechanism completes its action, causing switches $o$, $p$, $q$ to resume their initial positions. The attendant then re-closes the push-button switch, and the above described sequence of events is repeated until ignition occurs. But when ignition occurs immediately, the switch $w$ overrides the switch $v$, and holds the system in action until the gas pressure in the combustion chamber falls sufficiently to allow the switch $w$ to re-open or until the switch $q$ is opened by the action of the time-switch mechanism. When either of the switches opens the electromagnets $j$, $m$ release the switches $i$, $k$. Meanwhile the switch $p$ will have closed and as soon as the switch $i$ recloses current will be supplied to the motor $d$. The said motor is thereby set in motion for actuating the scavenging-air pump $h$, the starter having meanwhile performed the required starting operation on the engine to which it is connected. In due course the time-switch mechanism reaches the end of its movement, and the system reverts to the condition shown in the diagram.

When the system includes the switch $y$ this overrides the switches $q$, $w$, and opens when a predetermined starter speed is attained, so causing the switch $i$ to be closed for setting the scavenging-air pump to be set in motion.

The modified system shown in Figure 2, is essentially similar to that shown in Figure 1, and differs mainly in the following particulars. The switch $i$ is arranged separately from the switch $h$ and is provided with a separate electromagnet $j^1$, which is under the control of the switch $p$ in the time-switch mechanism. Also this mechanism is provided with a switch 3 which controls the ignition apparatus, and with a switch 4 which controls an electromagnet 5 acting on a normally-closed throttle 6 at the discharge side of the fuel pump $a$. In this arrangement the first effect of setting the system in motion is to supply scavenging air to the combustion chamber. Later, after the fuel pump has been set in motion the throttle valve is opened for admitting fuel to the combustion chamber, and then the ignition apparatus is brought into action. Thereafter, the system operates as above described until the time-switch mechanism completes its movements, when the system reverts to its initial condition.

Having thus described our invention what we claim as new and desire to secure by Letters Patent is:

1. An electrical system for automatically controlling the action of electric motors for driving the fuel and scavenging air-pumps, and the ignition apparatus, of a turbo-starter, comprising in combination switches for controlling the supply of current to the motors, electromagnetic means for operating the switches, a manually operable switch for bringing the system into action, a retaining electromagnet for the manually operable switch, an electromagnetically energisable time-switch mechanism for controlling the said electromagnetic means, a delayed-action switch for controlling at least that part of the electromagnetic means which serves to operate the current-controlling switch of the fuel-pump motor, another switch operable by fuel pressure for controlling the supply of current to the ignition apparatus and the delayed-action switch, and a further switch operable by the pressure of ignited gas for over-riding the delayed-action switch.

2. A system according to claim 1, and having an additional switch responsive to the speed of the starter for putting out of action at least that part of the electromagnetic means which serves to operate the current-controlling switch of the fuel-pump motor.

References Cited in the file of this patent

UNITED STATES PATENTS 2,443,648     Austin et al. ---------- June 22, 1948

FOREIGN PATENTS 614,341     Great Britain ---------- Dec. 14, 1948